United States Patent
Kim et al.

(10) Patent No.: US 12,470,900 B2
(45) Date of Patent: Nov. 11, 2025

(54) SERVER AND ROAD SIDE UNIT FOR V2X SERVICE

(71) Applicant: LG ELECTRONICS INC., Seoul (KR)

(72) Inventors: Donghwi Kim, Seoul (KR); Hakseong Kim, Seoul (KR); Kwangsik Kong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 436 days.

(21) Appl. No.: 17/924,285

(22) PCT Filed: Aug. 27, 2020

(86) PCT No.: PCT/KR2020/011461
§ 371 (c)(1),
(2) Date: Nov. 9, 2022

(87) PCT Pub. No.: WO2022/045393
PCT Pub. Date: Mar. 3, 2022

(65) Prior Publication Data
US 2023/0199445 A1    Jun. 22, 2023

(51) Int. Cl.
*H04W 4/40*    (2018.01)
*H04W 4/021*    (2018.01)
*H04W 4/12*    (2009.01)

(52) U.S. Cl.
CPC ............. *H04W 4/40* (2018.02); *H04W 4/021* (2013.01); *H04W 4/12* (2013.01)

(58) Field of Classification Search
None
See application file for complete search history.

(56) References Cited

U.S. PATENT DOCUMENTS

| | | | | |
|---|---|---|---|---|
| 2016/0323715 | A1* | 11/2016 | Leroux | ................. H04W 4/029 |
| 2017/0330457 | A1* | 11/2017 | Bhalla | ..................... G08G 1/093 |
| 2018/0322785 | A1 | 11/2018 | Jerichow et al. | |
| 2019/0028862 | A1 | 1/2019 | Futaki | |

(Continued)

FOREIGN PATENT DOCUMENTS

| | | |
|---|---|---|
| CN | 107040995 A | 8/2017 |
| CN | 109644378 A | 4/2019 |

(Continued)

OTHER PUBLICATIONS

English translation of KR-20200089959-A. (Year: 2025).*

(Continued)

*Primary Examiner* — Peter P Chau
(74) *Attorney, Agent, or Firm* — Birch, Stewart, Kolasch & Birch, LLP

(57) ABSTRACT

A vehicle-to-everything (V2X) server for providing a V2X service can include a processor; and a memory operatively coupled with the processor and configured to store instructions that, when executed by the processor, cause the V2X server to perform functions comprising configuring a virtual subscription area for a legacy V2X device; receiving a V2X message from a V2X device associated with the virtual subscription area; and transmitting the V2X message to a road side unit (RSU) device managing the legacy V2X device for relaying the V2X message to the legacy V2X device.

6 Claims, 14 Drawing Sheets

(56) References Cited

U.S. PATENT DOCUMENTS

| | | | |
|---|---|---|---|
| 2019/0150046 A1 | 5/2019 | Shiga et al. | |
| 2020/0260353 A1* | 8/2020 | Xu | H04W 76/27 |
| 2020/0260511 A1* | 8/2020 | Kim | H04W 4/44 |
| 2021/0004363 A1* | 1/2021 | Bailly | G06T 17/05 |
| 2022/0007145 A1* | 1/2022 | El Essaili | H04W 4/029 |

FOREIGN PATENT DOCUMENTS

| | | | |
|---|---|---|---|
| CN | 110769021 A | 2/2020 | |
| CN | 110784328 A | 2/2020 | |
| CN | 111586084 A | 8/2020 | |
| KR | 20200089959 A * | 7/2020 | |
| WO | WO 2017/030348 A1 | 2/2017 | |
| WO | WO 2017/052683 A1 | 3/2017 | |
| WO | WO 2019/104280 A1 | 5/2019 | |
| WO | WO-2020164414 A1 * | 8/2020 | H04W 4/08 |

OTHER PUBLICATIONS

3GPP, 3rd Generation Partnership Project; Technical Specification Group Services and System Aspects; Architecture enhancements for V2X services, (Release 16), Technical Specification, 3GPP TS 23.285 V16.3.0, Jul. 9, 2020, total 40 pages.

Huawei et al., "Uu parameter provisioning for interworking with legacy V2X UEs", S2-1900701, 3GPP, SA WG2 Meeting #130, Kochi, India, Jan. 24, 2019, total 3 pages.

Samsung, "RAT Selection for NR V2X Sidelink", R2-1817011, 3GPP TSG-RAN WG2 Meeting #104, Spokane, USA, Nov. 5, 2018, total 4 pages.

Zte et al., "Consideration on RAT and Interface Selection in NR V2X", R2-1900385, 3GPP TSG-RAN WG2 Meeting #105, Athens, Greece, Feb. 15, 2019, total 7 pages.

3GPP, "PCR Information Flows V2X Message Distribution", Ericsson, 3GPP TS 23.286, V1.1.0, May 2019, pp. 1-4.

3GPP, "UE and E-NB Type RSU Architectures for V2X Communications", Mitsubishi Electric, 3GPP TSG RAN WG3, R3-152640, Nov. 2015, pp. 1-5.

* cited by examiner

: First Subscription Area

: Second Subscription Area

SERVER AND ROAD SIDE UNIT FOR V2X SERVICE

CROSS-REFERENCE TO RELATED APPLICATION

This application is the National Phase of PCT International Application No. PCT/KR2020/011461, filed on Aug. 27, 2020, the contents of which are hereby incorporated by reference herein in their entirety.

BACKGROUND OF THE DISCLOSURE

Field

The present disclosure relates to a server and a road side unit (RSU) for vehicle-to-everything (V2X) services.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

Attempts are being made to extend V2X technology to be applied to pedestrians and other electronic devices, rather than simply being used for vehicle safety, such as vehicle-to-vehicle and vehicle-to-peripheral devices.

SUMMARY OF THE DISCLOSURE

The present disclosure provides a server and a road side unit (RSU) device for vehicle-to-everything (V2X) services.

In an aspect, a vehicle-to-everything (V2X) server for V2X service includes a processor, and a memory operatively coupled with the processor and configured to store instructions that, when executed by the processor, cause the V2X server to perform functions. The functions include configuring a virtual subscription area for a legacy V2X device, receiving a V2X message from a V2X device associated with the virtual subscription area, and transmitting the V2X message to a road side unit (RSU) managing the legacy V2X device.

In another aspect, a non-transitory computer-readable medium having computer-readable instructions stored thereon that are executable by a processor perform functions. The functions include configuring a virtual subscription area for a legacy V2X device, receiving a V2X message from a V2X device associated with the virtual subscription area, and transmitting the V2X message to a road side unit (RSU) managing the legacy V2X device.

In still another aspect, a road side unit (RSU) for vehicle-to-everything (V2X) service includes a processor, and a memory operatively coupled with the processor and configured to store instructions that, when executed by the processor, cause the server to perform functions. The functions include configuring a virtual subscription area for a legacy V2X device, transmitting, to a V2X server, information on the virtual subscription area, receiving, from the V2X server, a first V2X message for a V2X device associated with the virtual subscription area, generating a second V2X message based on the first V2X message, and transmitting, to a legacy V2X device, the second V2X message.

It is possible to provide V2X services to more diverse users and devices, as well as vehicles.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
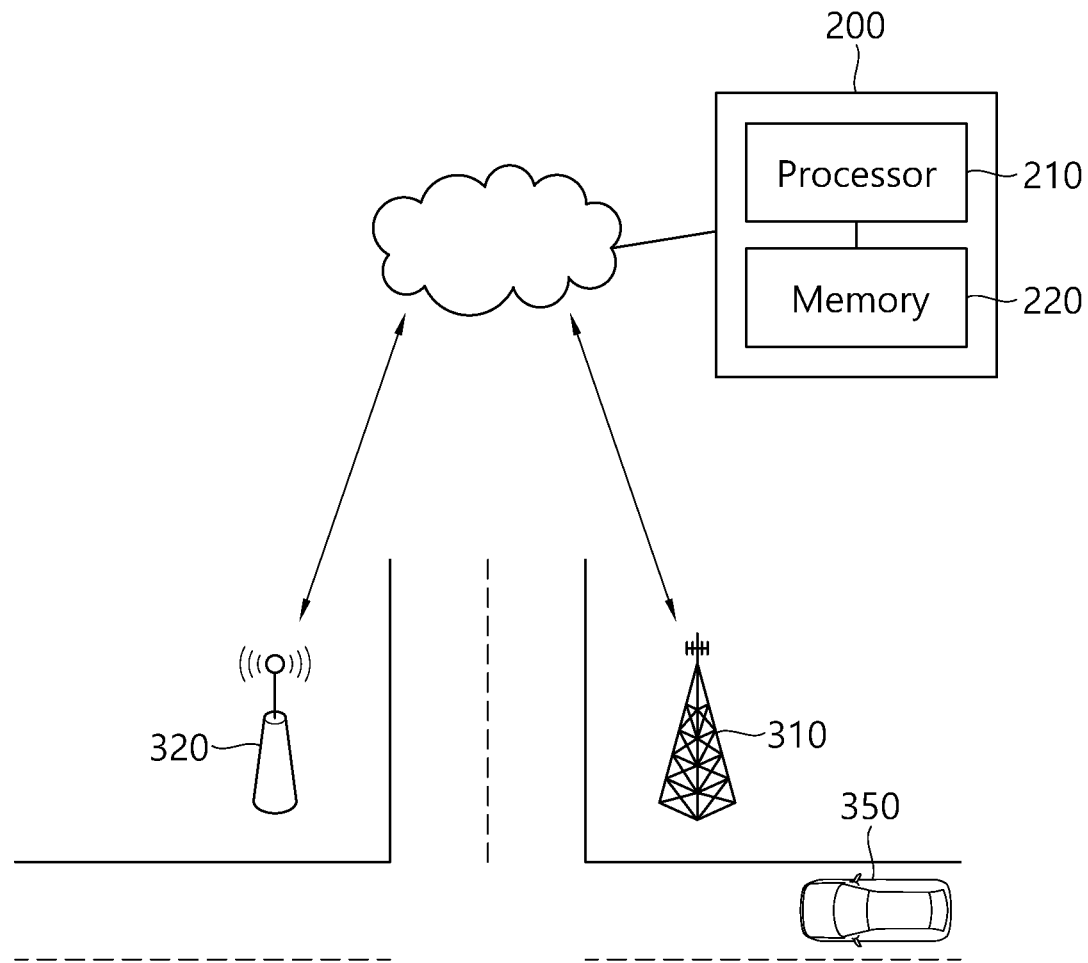
FIG. 1 shows a system to which an embodiment of the present specification is applied.
Figure 1:
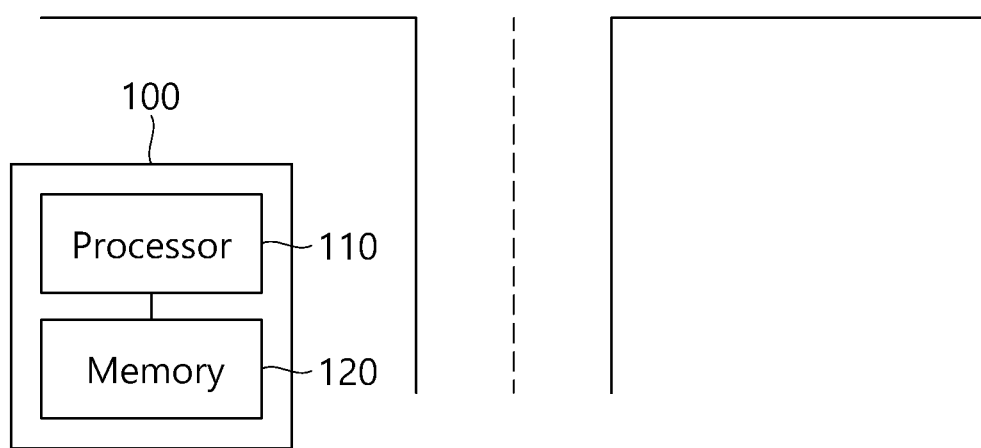

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it can be directly connected or coupled to the other element, but other elements can exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles can include automobiles, ships, aircraft, trains, motorcycles, bicycles, and the like. The vehicle can include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device can be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device can be mounted on a vehicle or electronic device as an on-board unit (OBU) to provide V2X functions and services to the vehicle. A V2X device disposed inside or outside the vehicle can be connected to the vehicle through a wireless interface to provide V2X functions and V2X services to the vehicle.

FIG. 1 shows a system to which an embodiment of the present specification is applied.

A system includes a V2X device 100 and a V2X server 200. The V2X device 100 can communicate with the V2X server 200 through the base station 310 or a Road Side Unit (RSU) 320. The V2X device 100 can communicate with the base station 310, the RSU 320, a neighbor vehicle 350 and/or a neighbor V2X device using a wireless communication protocol. There is no limitation on the wireless communication protocol. The wireless communication protocol can include Dedicated Short Range Communications (DSRC), Cellular-V2X (C-V2X), WiFi, BLUETOOTH and/or cellular communication protocols based on 3rd Generation Partnership Project (3GPP) (e.g., Wideband Code Division Multiple Access (WCDMA), Long Term Evolution (LTE), New Radio (NR), etc.).

The V2X server 200 receives one or more V2X messages from the V2X device 100 within a managed area. The V2X server 200 can forward the one or more collected V2X messages to the subscribing V2X device 100.

The V2X message can periodically or aperiodically be transmitted to the V2X server 200 by the V2X device 100 (or RSU 320), and is a message providing status information of the V2X device 100 (or device managed by the RSU 320). For example, the V2X device 100 can transmit 10 V2X messages per second. The V2X server 200 collects V2X messages from multiple V2X devices, and forwards the V2X messages to subscribing V2X devices.

The following table shows examples of information elements included in the V2X message. Not all information elements are required, and names are examples only. Information elements can be added/changed/deleted according to policies or circumstances.

TABLE 1

| Name | Description |
|---|---|
| V2X ID | A temporary identifier (ID) for identifying the V2X device sending this message. It is randomly selected by the V2X device and can be changed periodically. The size can be 4 octets. |
| Position | Indicates the location of the V2X device. Can contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. Can include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |
| Publishing Area | To be described later |

The V2X message transmitted by the V2X device 100 to the V2X server 200 is called an uplink (UL) V2X message, and the V2X message transmitted by the V2X server 200 to the V2X device 100 is called a downlink (DL) V2X message.

The V2X device 100 can include a processor 110 and a memory 120. The processor 110 implements the functions of the V2X device 100 and can include one or more software modules. The V2X device 100 can further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 can be a Mobile/Mutli-access Edge Computing (MEC)-based server or a centralized-based server. The V2X server 200 can be called another name, such as a Geocast server or a SoftV2X server. The V2X server 200 can include a processor 210 and a memory 220. The processor 210 implements the function of the V2X server 200, and can include one or more software modules.

The processors 110 and 210 can include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein can be stored in the memories 120 and 220 and executed by the processors 110 and 210.

Memories 120 and 220 can store information accessible by processors 110 and 210. The information can include instructions executable by the processors 110 and 210 and/or data processed by the processor. Memories 120 and 220 can include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Message Queuing Telemetry Transport (MQTT) is used as a message queuing protocol between the V2X device 100 and the V2X server 200, but this is only an example. Advanced Message Queuing Protocol (AMQP), HyperText Transfer Protocol (HTTP), and/or vendor specific protocols can be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

Figure 2:
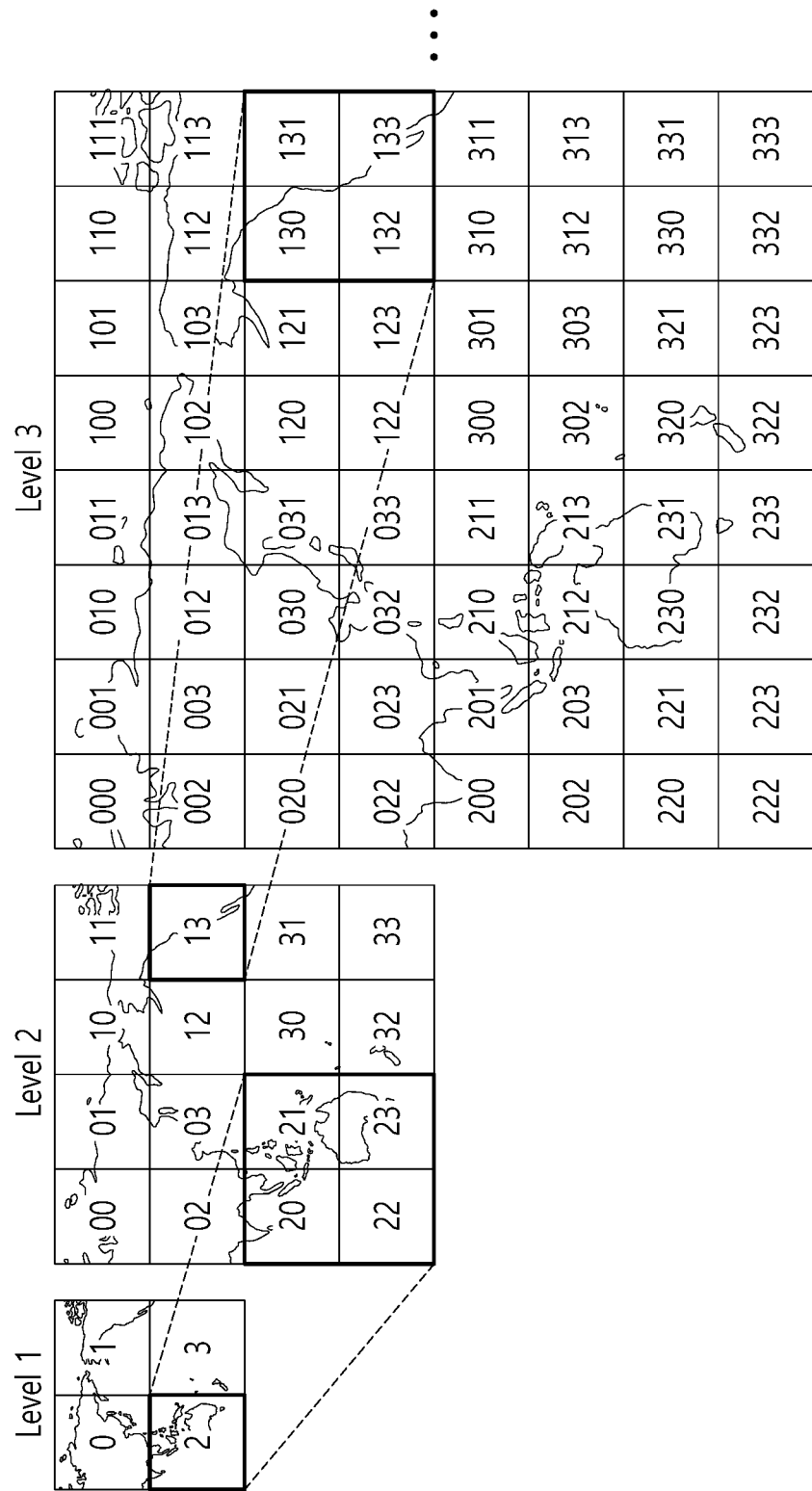
FIG. 2 shows an example of a tile using a quadtree according to an embodiment of the present specification.

FIG. 2 shows an example of a tile using a quadtree.

The quadtree represents a partition of space in two dimensions by decomposing a map (i.e., world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID can have the number of bits corresponding to the level. For example, each internal node in the quadtree can have four children.

The V2X device can acquire the ID of the tile in which the V2X device is located based on location information of the V2X device (e.g., latitude and longitude). The V2X device and/or the V2X server can adjust the size of the area by adjusting the level according to the situation.

In the following embodiment, the area for the V2X service is defined as follows.
  Management area: The area managed by the V2X server. The management area includes one or more tiles.
  Subscription area: The area where the V2X device requests a subscription to the V2X server. The subscription area can be referred to as another name, such as a concerned area, an impact area, or a geocast area. The subscription area contains one or more tiles. The subscription area can be included in one management area, and can be defined across a plurality of management areas managed by a plurality of V2X servers.
  Publishing area: The area where the V2X device publishes V2X messages to the V2X server. The publishing area can include one tile in each level. The publishing area can indicate a tile where the V2X device is currently located. Some or all of the publishing area can overlap with the subscription area.

Figure 3:
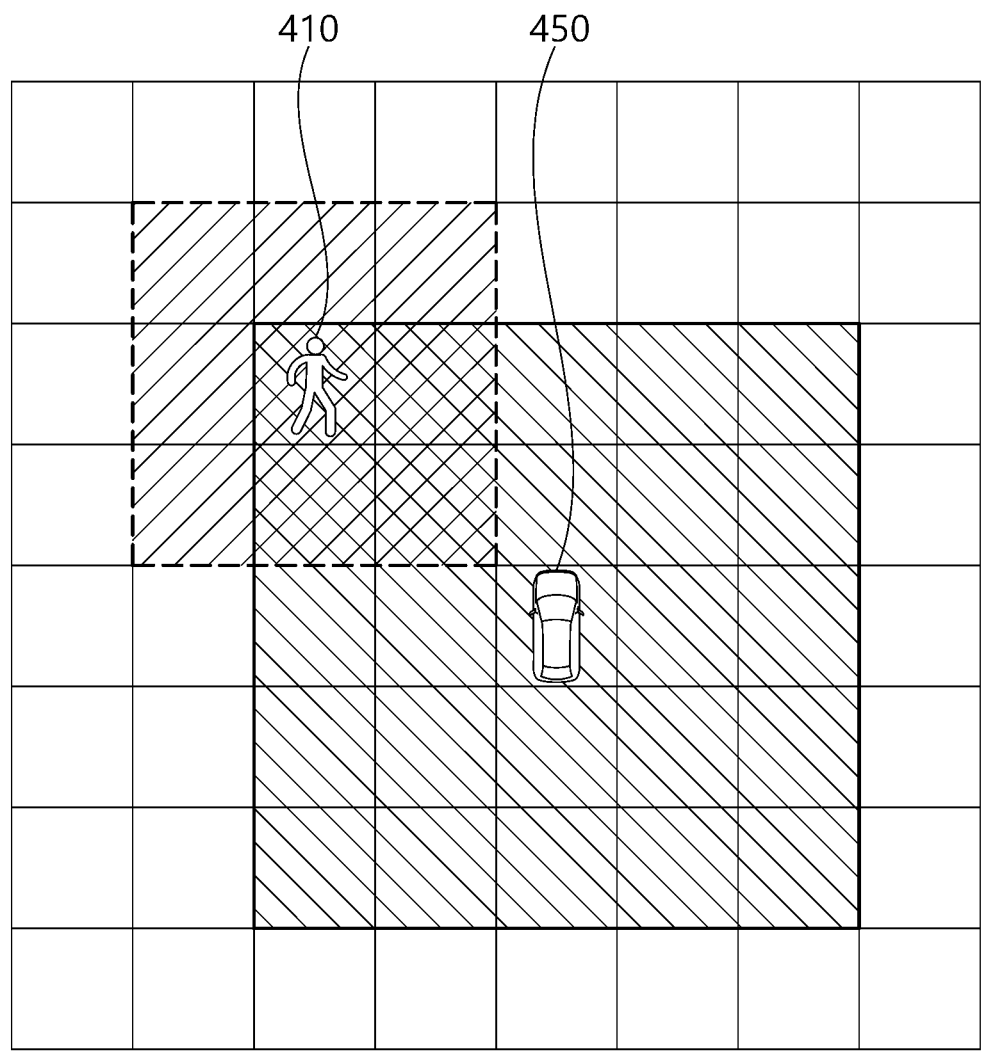
FIG. 3 shows an example in which a subscription area is set according to an embodiment of the present specification.
Figure 3:
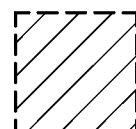
Figure 3:
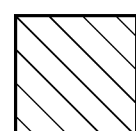

FIG. 3 shows an example in which a subscription area is set.

A first subscription area is set to the first V2X device 410 (e.g., the leftward sloping hashing around the person associated with first V2X device 410), and a second subscription area is set to the second V2X device 450 (e.g., the rightward sloping hashing around the vehicle associated with/corresponding to second V2X device 450). Each V2X device can set/change/delete the subscription area periodically or aperiodically (e.g., when its location is changed). Each V2X device can request setting/change/deletion of the subscription area to the V2X server.

In this example, the number of tiles included in the first subscription area is 9 and the number of tiles included in the second subscription area is 25, but the number of tiles included in the subscription area or the shape of the subscription area is not limited thereto. The subscription area can include a tile in which the V2X device is located. Alternatively, the subscription area can include one or more tiles other than a tile in which the V2X device is located.

The first V2X device 410 can generate a first V2X message and periodically send the first V2X message to the V2X server. The second V2X device 450 can generate a second V2X message and periodically send the second V2X message to the V2X server.

The V2X server can forward one or more V2X messages received in or around a subscription area to the V2X device related to the subscription area.

A device that sets a subscription area can be referred to as a "subscriber device." A device that transmits a V2X message to a V2X server can be referred to as a "provider device." A V2X device can be a subscriber device, a provider device, or both a subscriber device and a provider device. The V2X server can forward the V2X messages transmitted by the provider devices in the management area to the subscriber device.

The V2X server can deliver the V2X message of a provider device "associated" to the subscription area of a subscriber device to the subscriber device. A provider device associated with a subscription area of a subscriber device can be referred to as a "subscribed provider device." The provider device associated with the subscription area of the subscriber device can satisfy at least one of the following conditions (i) to (iii): (i) part or all of the publishing area of the provider device overlaps with the subscription area of the subscriber device; (ii) some or all of the subscription area of the provider device overlaps the subscription area of the subscriber device; and/or (iii) the location where the provider device transmits the V2X message is within the subscription area of the subscriber device.

According to condition (i) or (iii), the V2X server delivers V2X messages received in the first subscription area to the first V2X device 410. The V2X server delivers V2X messages received in the second subscription area to the second V2X device 450.

Since the first V2X device 410 is located in the second subscription area, the V2X server can forward the first V2X message to the second V2X device 450. The second V2X device 450 is a subscriber device, and the first V2X device 410 is a subscribed provider device.

Since the second V2X device 450 is not located in the first subscription area (which means that condition (i) or condition (iii) is not satisfied), the V2X server does not forward the second V2X message to the first V2X device 410 (e.g., the person is in the vehicle's subscription area so the vehicle can receive V2X messages from the person, but the vehicle is not in the person's subscription area just yet so the person does not receive V2X messages from the vehicle, according to some situations or configurations). In other words, different areas or zones can be set for the first V2X device 410 and second V2X device 450, so that the second V2X device 450 is aware of the first V2X device 410, but the first V2X device 410 may not be aware of second V2X device 450, since the first V2X device 410 has a much smaller subscription area. The second V2X device 450 is not a provider device of the first V2X device 410. If condition (ii) is considered, the second V2X device 450 can be a provider device of the first V2X device 410 (e.g., even if conditions (i) and (iii) are not met, the server can be configured to still deliver a message from the second V2X device to the first V2X device when condition (ii) is met).

Figure 4:
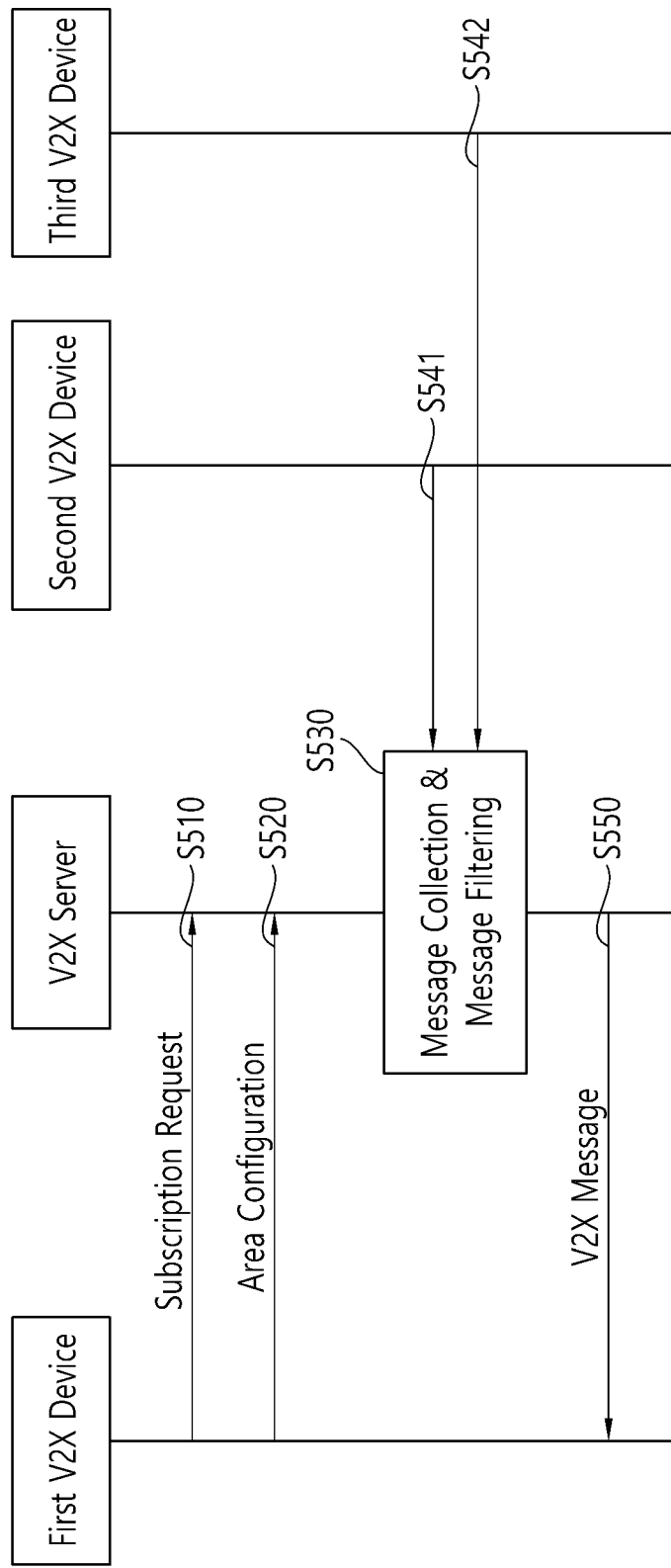
FIG. 4 is a flowchart illustrating a method for a V2X service according to an embodiment of the present specification.

FIG. 4 is a flowchart illustrating a method for a V2X service according to an embodiment of the present specification.

In step S510, a V2X device sends a subscription request for requesting subscription of the V2X service to a V2X server. The subscription request can include information about the identifier, location, etc. of the V2X device. The V2X server can transmit a subscription response for granting or rejecting subscription to the V2X device in response to the subscription request.

In step S520, the V2X device can send the area configuration related to the V2X service to the V2X server. The area configuration can be included in a separate message or included in the subscription request. The area configuration includes information about configuration and/or modification of the subscription area.

In step S530, the V2X server can collect V2X messages from V2X devices in the management area, and perform message filtering.

The V2X server receives the first V2X message from the second V2X device (step S541), and receives the second V2X message from the third V2X device (step S542). Assume that the second V2X device belongs to the subscription area of the first V2X device, but the third V2X device does not belong to the subscription area of the first V2X device.

In step S550, the V2X server publishes the first V2X message belonging to the subscription area of the first V2X device to the first V2X device. The first V2X device is a subscriber device and the second V2X device is a provider device. Since a V2X message of the third V2X device is not delivered to the first V2X device, the third V2X device is not a provider device of the first V2X device.

If there are a plurality of V2X messages to be sent to the first V2X device, the plurality of V2X messages can be published separately or as a single message.

Message filtering is that V2X server filters the V2X messages to be transmitted to V2X devices that have completed the subscription request. Message filtering can be referred to as a process of selecting a subscribed provider device associated with a subscriber device among a plurality of provider devices. Filtering conditions can be defined differently depending on the subscription area and/or the state of the V2X device. For example, if the number of V2X devices in the subscription area is large, the filtering conditions can be modified so that more messages are filtered out. Filtering condition can be related to the degree of risk of the V2X device.

While a vehicle travels at high speed, it is necessary to minimize or shorten the period at which the V2X message is transmitted so that it can be prepared for a dangerous situation. When the V2X server is connected through an IP network, the time required to transmit a message may be extended, and the transmission delay may increase.

Figure 5:
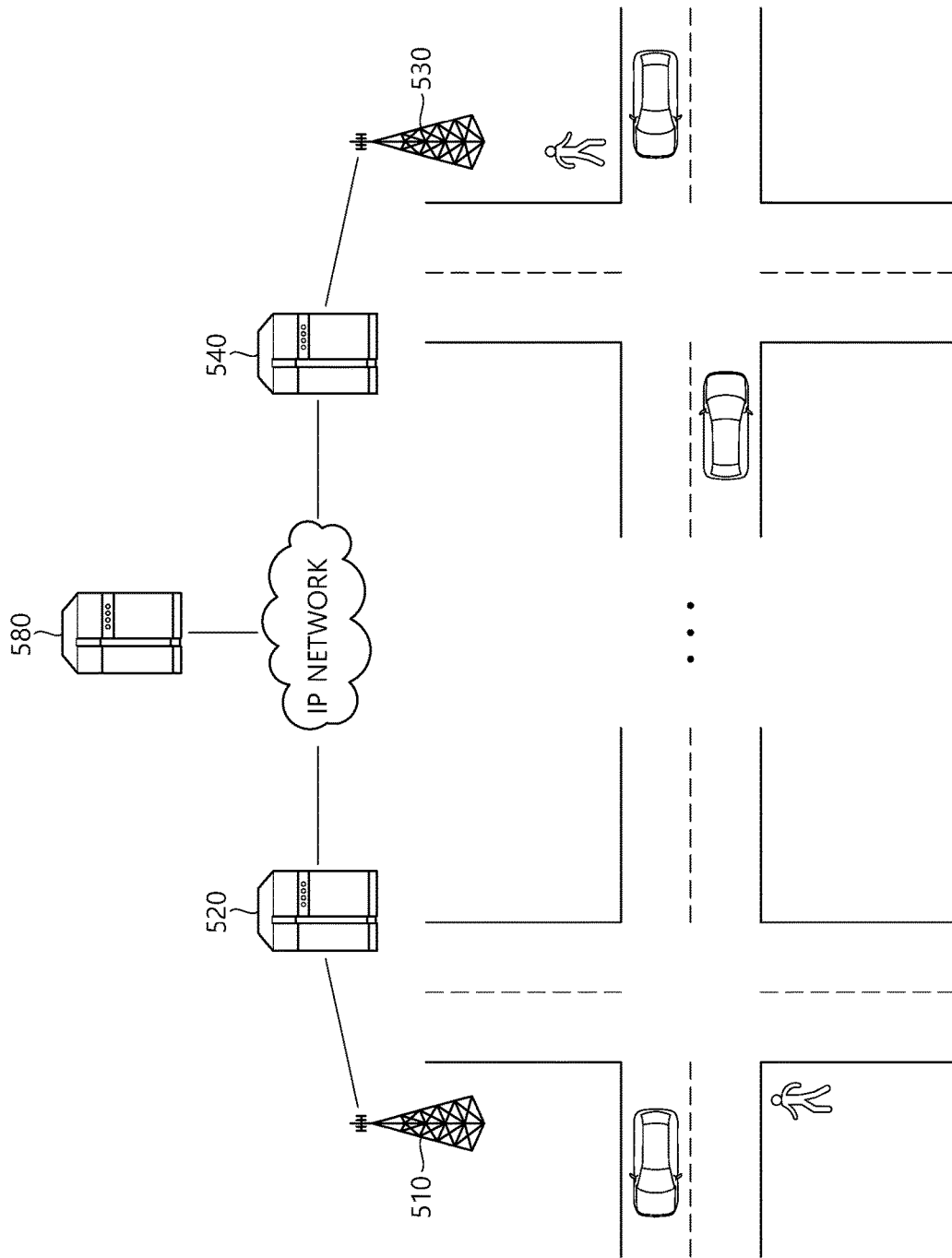
FIG. 5 shows a system for a V2X service according to an embodiment of the present specification.

FIG. 5 shows a system for a V2X service according to an embodiment of the present specification.

To implement a V2X server, local V2X servers 520 and 540 are used as edge computing devices, and a global V2X server 580 is used as a cloud server. Although it is shown that the two local V2X servers 520 and 540 are connected to the global V2X server 580 through an IP network, but there is no limit to the number of connected local V2X servers.

The global V2X server 580 manages the local V2X servers 520 and 540. The local V2X servers 520 and 540 can communicate directly with each other, or can communicate through the global V2X server 580. The global V2X server 580 can provide each V2X device with local server information on the local V2X server and information on the validity period of the local server information.

Each of the local V2X servers 520 and 540 has a management area, and provides V2X services to V2X devices in each management area. Each local V2X server can receive a V2X message from a V2X device in the management area. The first local V2X server can deliver the received V2X message to a first V2X device in its management area. The first local V2X server can forward the received V2X message to the second local V2X server. The first local V2X server can deliver the received V2X message to a second V2X device in the management area of the second local V2X server through the global V2X server 580.

The local V2X servers 520 and 540 can be deployed at the edge of the network, and here an example is shown that they are deployed around base stations 510 and 530. The 1:1 connection between the local V2X server and the base station is only an example. A plurality of local V2X servers can be deployed in one base station, or a single local V2X server can be deployed in a plurality of base stations.

The V2X device can receive information about local V2X servers from the global V2X server based on its current location. The V2X device can send a subscription request to the local V2X server and can register a subscription area. The V2X device can transmit its own V2X message to the local V2X server. The V2X device can receive the V2X message of surrounding V2X devices associated with the subscription area from the local V2X server.

Figure 6:
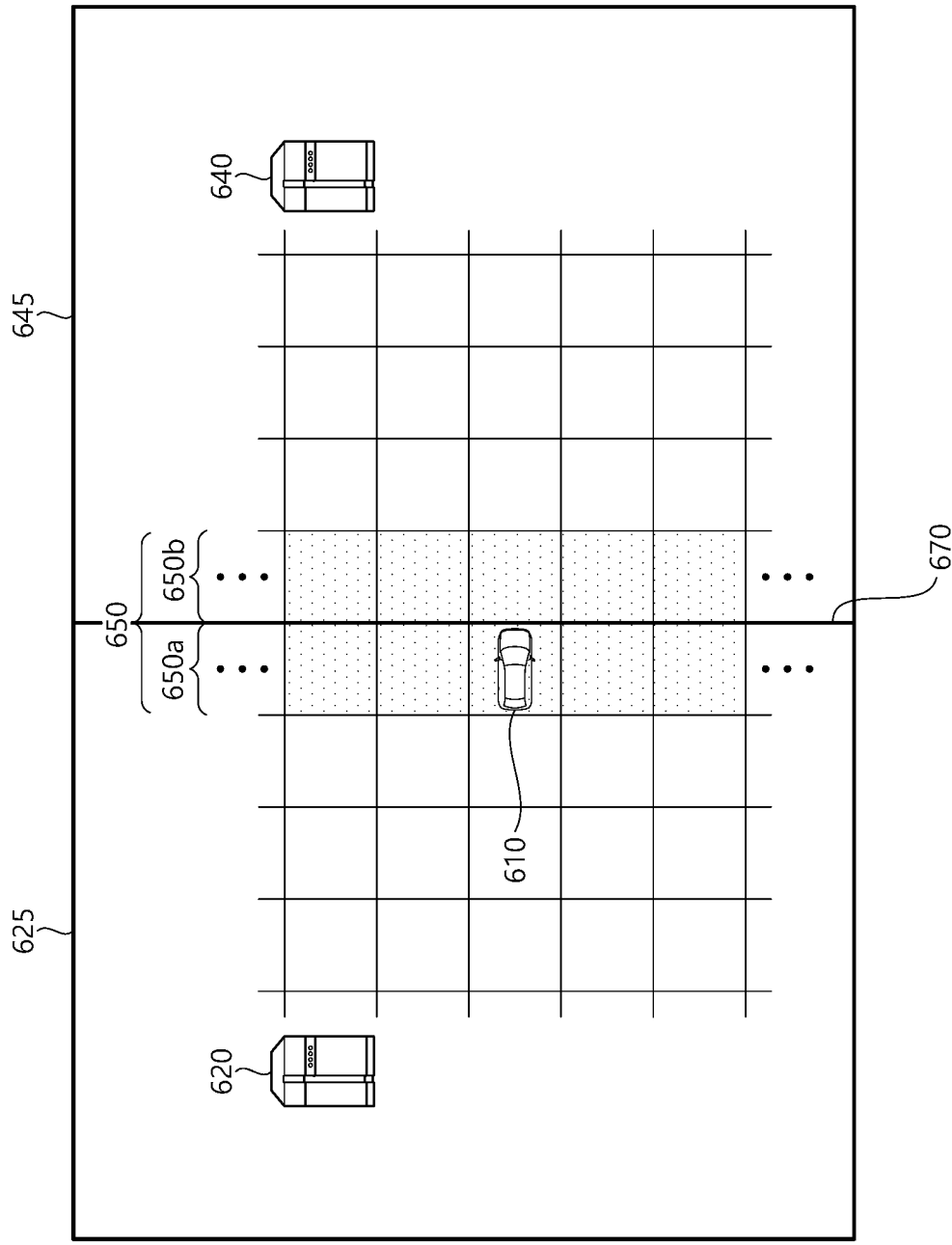
FIG. 6 shows an example in which a boundary area between two local V2X servers is defined according to an embodiment of the present specification.

FIG. 6 shows an example in which a boundary area between two local V2X servers is defined.

A first local V2X server 620 has a first management area 625, and a second local V2X server 640 has a second management area 645. A boundary 670 can be set between the two management areas 625 and 645. Here, it is shown that there is a rectangular management area and the boundary 670 is formed along one side, but the shape of the management area or the boundary is not limited (e.g., the boundary can have a curved shape or be angular, etc.).

A boundary area 650 (e.g., the dotted hashing area) is defined along the boundary 670. The boundary area 650 includes a first boundary area 650a belonging to the first management area 625 of the first local V2X server 620 and a second boundary area 650b belong to the second management area 645 of the second local V2X server 640. It is shown that each of the first boundary area 650a and the second boundary area 650b includes tiles which are adjacent to the boundary 670 and area arranged along the boundary 670, but this is only an example. Each of the first boundary area 650a and the second boundary area 650b can include tiles adjacent to the boundary 670.

All or part of the subscription area of the V2X device 610 can overlap with the boundary area 650. At least one of the first local V2X server 620 and the second local V2X server 640 can transmit the V2X message to the V2X device 610.

The V2X device 610 can be located in the boundary area 650. This can mean that the publishing area of the V2X device 610 overlaps the boundary area 650. The V2X device 610 transmits the V2X message to at least one of the first local V2X server 620 and the second local V2X server 640, or to both servers.

The V2X device can receive local server information about the first and second local V2X servers and validity period information from the global V2X server. The local server information can include information about the ID of the local V2X server, the management area and/or the boundary area of the local V2X server. The validity period information indicates a period during which the local V2X server information is valid. When the validity period expires, the V2X device can try to receive the local server information again from the global V2X server.

Figure 7:
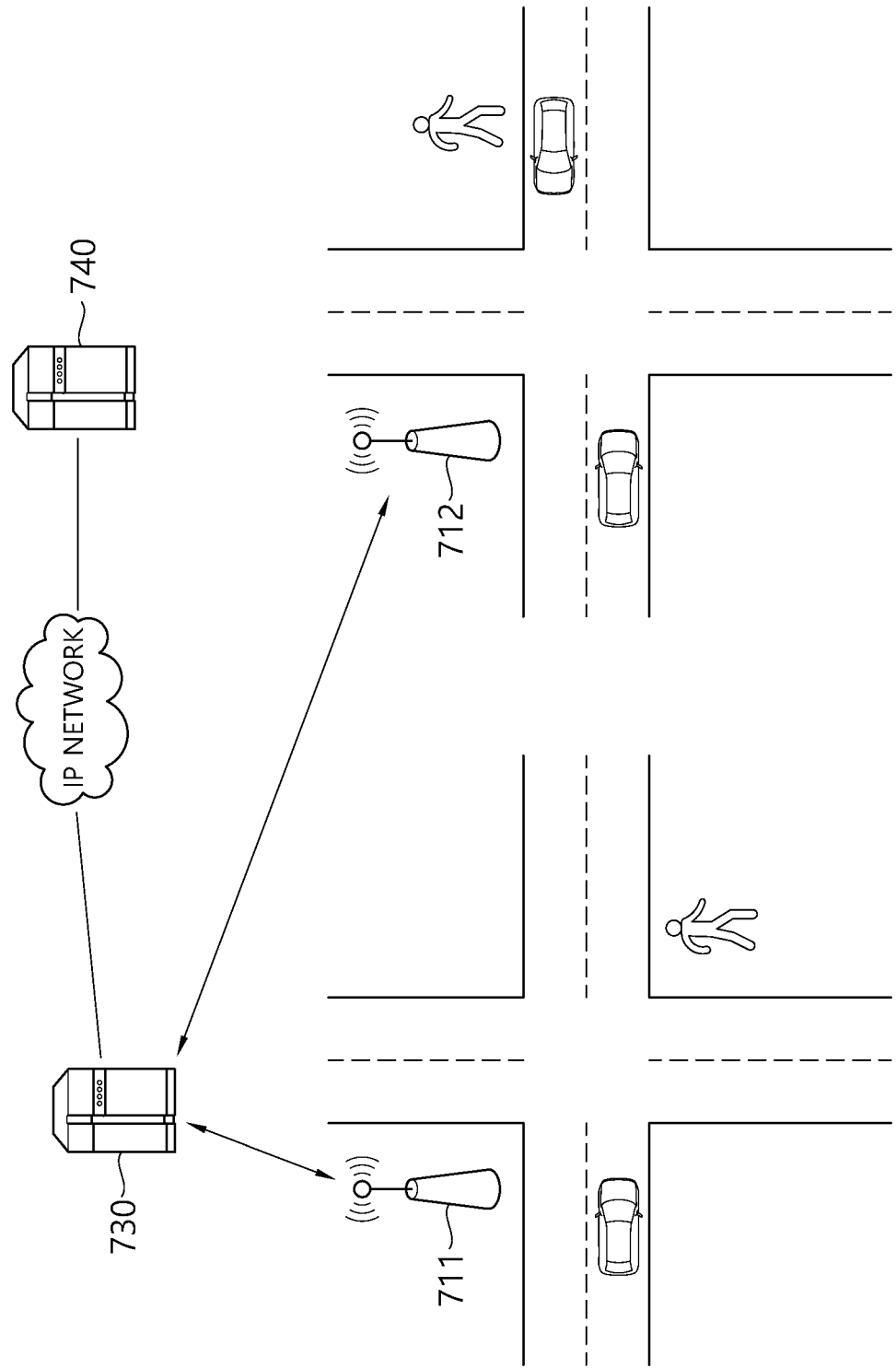
FIG. 7 shows a connection between an RSU and a local V2X server according to an embodiment of the present specification.

FIG. 7 shows a connection between an RSU and a local V2X server.

An RSU is deployed around the road and can communicate with V2X devices, such as vehicles or pedestrians, through a wireless medium based on a direct communication protocol (for example, DSRC, C-V2X, etc.). A V2X device that supports only communication with the RSU and/or device-to-device direct communication is called a legacy V2X device. The legacy V2X device can only communicate with the RSU, not directly with the V2X server. A V2X device communicating with the V2X server is not connected to the RSU, and can only receive a V2X message transmitted by the RSU.

A first RSU 711 is connected to a local V2X server 730 through a wired and/or wireless network. The local V2X server 730 is connected to a global V2X server 740 through an IP network. A second RSU 712 is also connected to the local V2X server 730 through a wired and/or wireless network. Although it shows that the local V2X server 730 is connected to two RSUs 711 and 712, one or more RSUs can be connected to the local V2X server 730.

The RSUs 711 and 712 can be connected to the local V2X server 730 and/or the V2X device based on various wireless/wired communication protocols such as DSRC, C-V2X, cellular communication, a dedicated link, etc. The RSUs 711 and 712 receive a message from the local V2X server 730 through a wireless link or a wired link, such as Ethernet, IP network, etc., and transmit a radio signal to the V2X device through a wireless link such as DSRC, C-V2X, etc. The RSUs 711 and 712 can receive a message from the V2X device via a wireless link, and deliver this message to the local V2X server 730 via a wireless link or a wired link.

Although the RSUs 711 and 712 and the local V2X server 730 are shown to be separated, this is only an example. The RSUs 711 and 712 and the local V2X server 730 can be integrally implemented, or the RSUs 711 and 712 can perform some of the functions of the local V2X server 730.

Each of the RSUs 711 and 712 can include a memory and a processor. The memory can store information accessible by the processor. The information can include instructions executable by the processor and/or data processed by the processor. The RSUs 711 and 712 can further include a wireless modem for wireless link communication and a wired modem for wired link communication.

An RSU management area refers to a geographic area managed by an RSU. The RSU management area can include an area to which a radio frequency (RF) signal of the RSU arrives. A V2X device located in the RSU management area can receive a message transmitted by the RSU.

An RSU subscription area is the area where the RSU requests a subscription to the V2X server. The RSU subscription area can include one or more tiles. The RSU subscription area is defined by the RSU and can be set simultaneously with or separately from a subscription request. The RSU subscription area can be configured for each RSU by the V2X server. The RSU subscription area can overlap with the RSU management area, and there is no limitation in setting these areas.

The V2X server can deliver the V2X message of the V2X device 'associated' with the RSU subscription area to the RSU. A V2X device associated with the RSU subscription area can satisfy at least one of the following conditions (i) to (iii). Condition (i), in which some or all of the announcement area of the V2X device overlaps the RSU subscription area. Condition (ii), in which a part or all of the subscription area of the V2X device overlaps the RSU subscription area. Condition (iii), in which the location where the V2X device transmits the V2X message is within the RSU subscription area.

Figure 8:
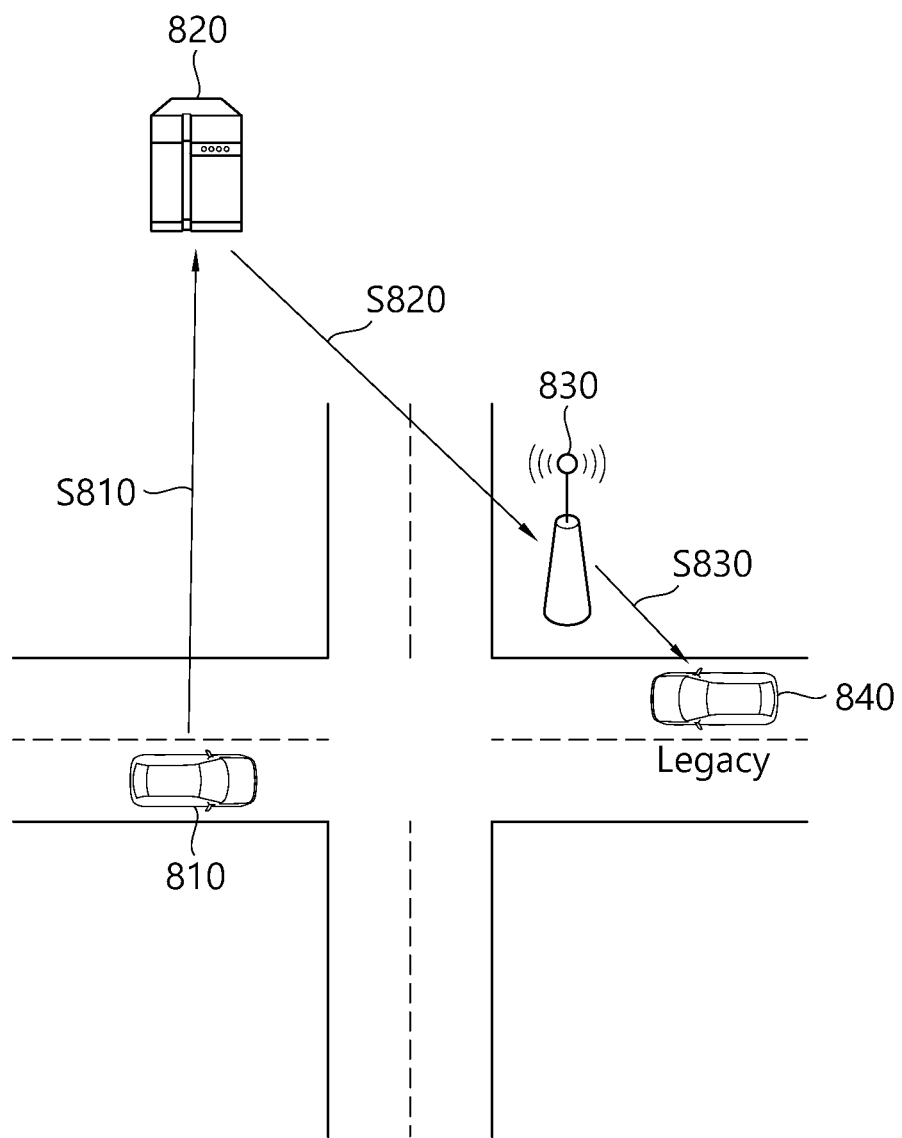
FIG. 8 shows an example in which a message is delivered from a V2X device to a legacy V2X device according to an embodiment of the present specification.

FIG. 8 shows an example in which a message is delivered from a V2X device to a legacy V2X device (e.g., the message is converted and relayed via the RSU).

A V2X device 810 transmits a V2X message to a local V2X server 820 (S810). When the V2X device 810 is associated with the RSU subscription area of an RSU 830, the local V2X server 820 transmits the V2X message to the RSU 830 (S820). The RSU 830 converts the received V2X message into a format that the legacy V2X device 840 is able to receive and read, and transmits the converted message to the legacy V2X device 840 (S830).

Figure 9:
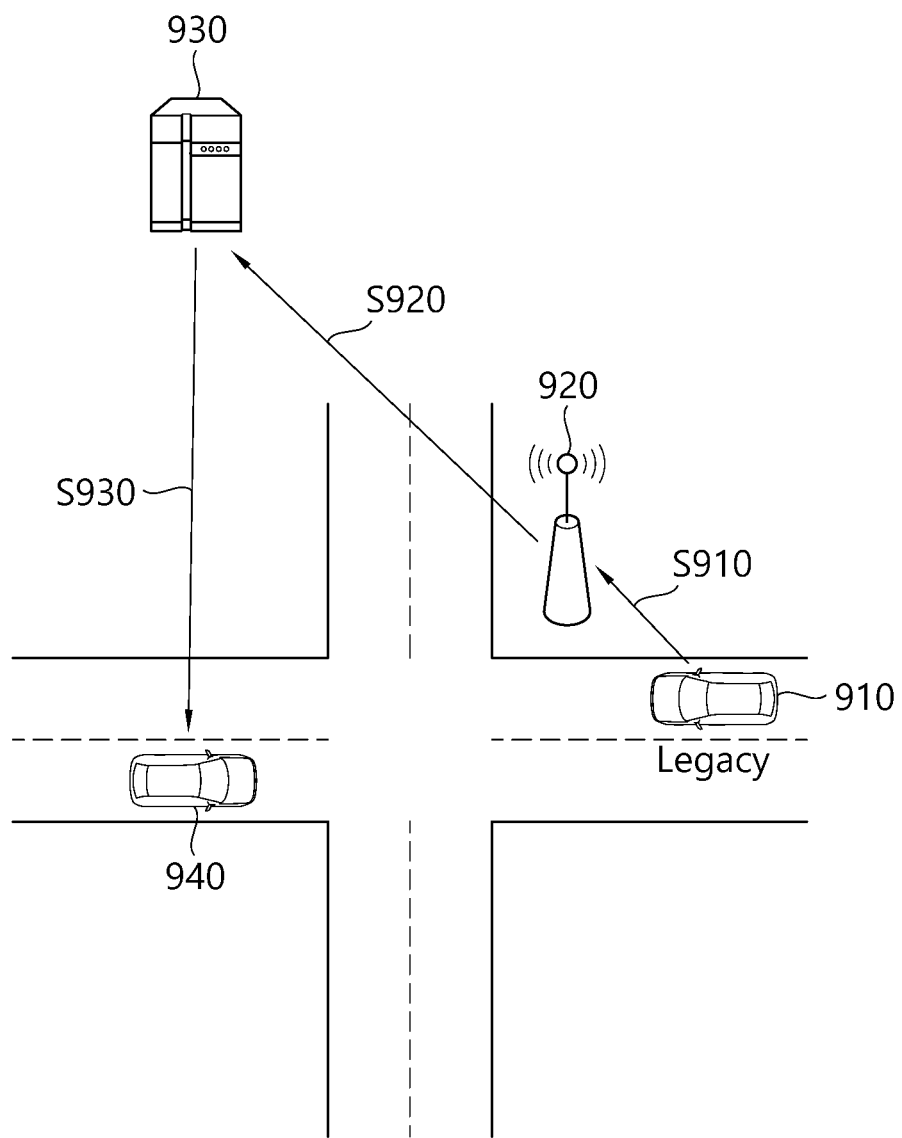
FIG. 9 shows an example in which a message is delivered from a legacy V2X device to a V2X device according to an embodiment of the present specification.

FIG. 9 shows an example in which a message is delivered from a legacy V2X device to a V2X device.

A legacy V2X device 910 transmits a legacy V2X message to an RSU 920 (S910). The RSU 920 converts the legacy V2X message into a V2X message that the V2X device 940 can receive. For example, the V2X message can further include information about the publishing area of the legacy V2X device 910. The RSU 920 transmits the V2X message to a local V2X server 930 (S920). When the legacy V2X device 910 is associated with the subscription area of a V2X device 940, the local V2X server 930 transmits the V2X message to the V2X device 940 (S930).

The legacy V2X device is based on direct communication, and does not support the aforementioned areas (e.g., subscription area, announcement area, etc.) for the V2X server. In order to support the V2X server, the RSU can set a virtual subscription area and/or publishing area to the legacy V2X device.

The virtual subscription area refers to the subscription area of the legacy V2X device set by the RSU. The virtual publishing area refers to the publishing area of the legacy V2X device set by the RSU. The RSU can register the virtual subscription area with the local V2X server and complete the subscription request. A V2X device in which the virtual publishing area and/or the virtual subscription area is set is called a virtual V2X device. The RSU can add the virtual publishing area to a V2X message received from the virtual V2X device, and deliver the added V2X message to the local V2X server.

The local V2X server (and/or RSU) can allocate a virtual V2X ID to each virtual V2X device. The virtual V2X ID can be used to identify the virtual V2X device for communication between the local V2X server and the RSU. Because the legacy V2X device cannot make a request for subscription on its own, the local V2X server can consider that the legacy V2X device with virtual V2X IDs have completed a subscription request. The local V2X server (and/or RSU) can add a virtual V2X ID to a V2X message received from a legacy V2X device (or replace a V2X ID with a virtual V2X ID), and transmit the added V2X message to other V2X devices. If the virtual V2X ID is included in the V2X message received from the V2X device, the local V2X server or RSU can generate a V2X message from which the virtual V2X ID is removed, and can transmit the generated V2X message to the legacy V2X device.

Figure 10:
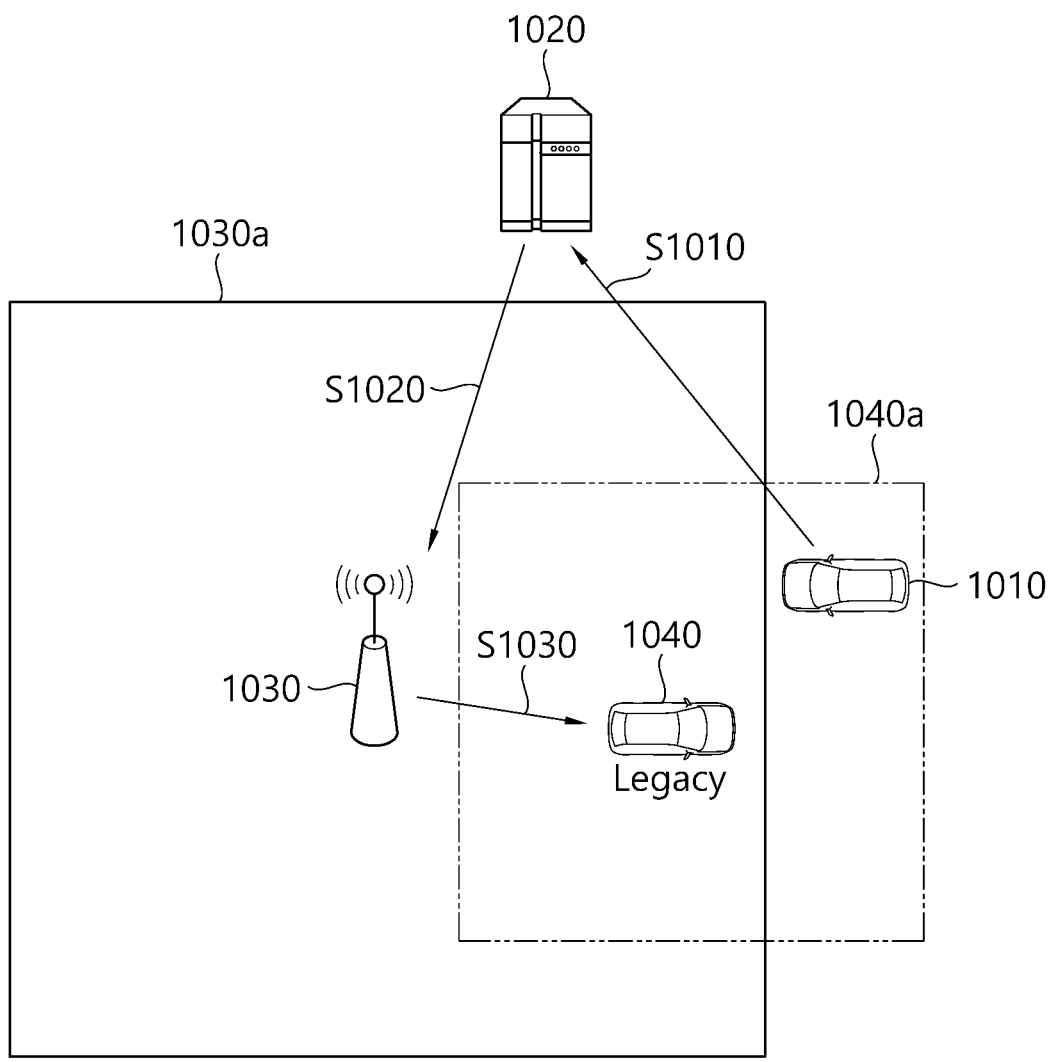
FIG. 10 shows an example in which a message is transmitted to a virtual V2X device according to an embodiment of the present specification.

FIG. 10 shows an example in which a message is transmitted to a virtual V2X device.

An RSU 1030 sets an RSU subscription area 1030a and a virtual subscription area 1040a for a legacy V2X device 1040.

A V2X device 1010 transmits a V2X message to a local V2X server 1020 (S1010). The V2X device 1010 is not associated with the RSU subscription area 1030a of the RSU 1030, but is associated with the virtual subscription area 1040a (e.g., 1010 is outside of 1030a, but 1010 is inside of 1040a). Therefore, the local V2X server 1020 transmits the V2X message to the RSU 1030 that manages the virtual V2X device 1040 (S1020). The RSU 1030 converts the received V2X message into a format that the virtual V2X device 1040 is able to receive and read, and transmits the converted message to the virtual V2X device 1040 (S1030).

Figure 11:
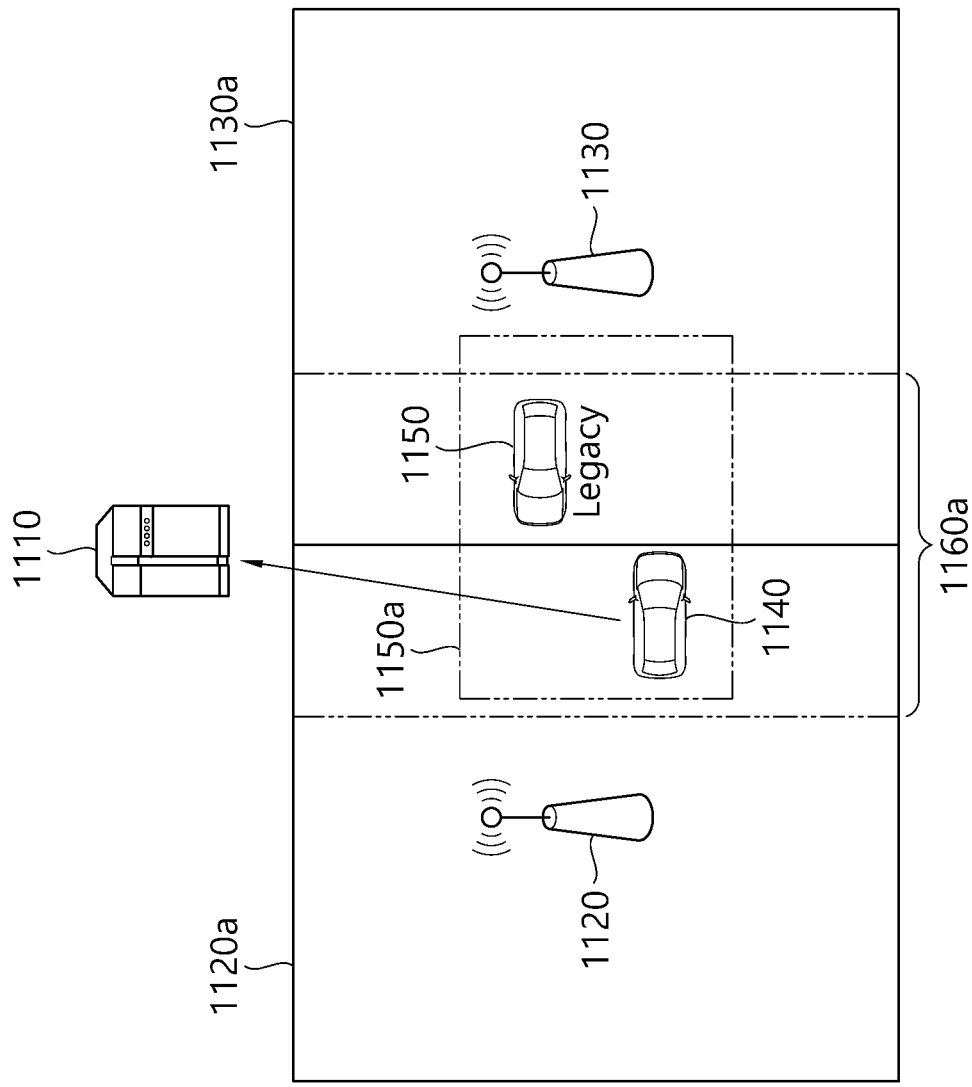
FIG. 11 shows an example for a V2X service at the boundary between a plurality of RSUs according to an embodiment of the present specification.

FIG. 11 shows an example for a V2X service at the boundary between a plurality of RSUs.

A local V2X server 1110 manages a first RSU 1120 and a second RSU 1130. The first RSU 1120 sets the first RSU subscription area 1120a, and the second RSU 1130 sets the second RSU subscription area 1130a. The first RSU subscription area 1120a and the second RSU subscription area 1130a are adjacent to each other, but do not overlap. A V2X device 1140 is located in the first RSU subscription area 1120a of the first RSU 1120, and is moving toward a legacy V2X device 1150. The legacy V2X device 1150 is located in the second RSU subscription area 1130a of the second RSU 1130, and is moving toward the V2X device 1140.

The V2X device 1140 sends a V2X message to the local V2X server 1110. Despite the risk of collision between the V2X device 1140 and the legacy V2X device 1150, the V2X message of the V2X device 1140 is not delivered to the legacy V2X device 1150. This is because the V2X device 1140 is not associated with the second RSU subscription area 1130a yet (e.g., V2X device 1140 still remains just outside of the second RSU subscription area 1130a).

To solve this problem, the following scheme is proposed.

In the first scheme, a virtual subscription area 1150a can be set to the legacy V2X device 1150. The virtual subscription area 1150a can be set by the local V2X server 1110 or the second RSU 1130. Since the V2X device 1140 is associated with the virtual subscription area 1150a, the V2X message of the V2X device 1140 can be delivered to the legacy V2X device 1150 through the local V2X server 1110 and the second RSU 1130 (e.g., since V2X device 1140 is within the virtual subscription area 1150a).

In the second scheme, an overlapped area can be set between a plurality of adjacent RSU subscription areas (and/or a plurality of RSU management areas). The local V2X server 1110 can set the overlapped area 1160a around the boundary between the first RSU subscription area 1120a and the second RSU subscription area 1130a. The overlapped area 1160a can include one or more tiles, but is not limited in size or shape. The local V2X server 1110 can transmit a V2X message received from the V2X device 1140 in the overlapped area 1160a to the second RSU 1130 associated with the overlapped area 1160a. The second RSU 1130 can transmit the V2X message to the legacy V2X device 1150.

Figure 12:
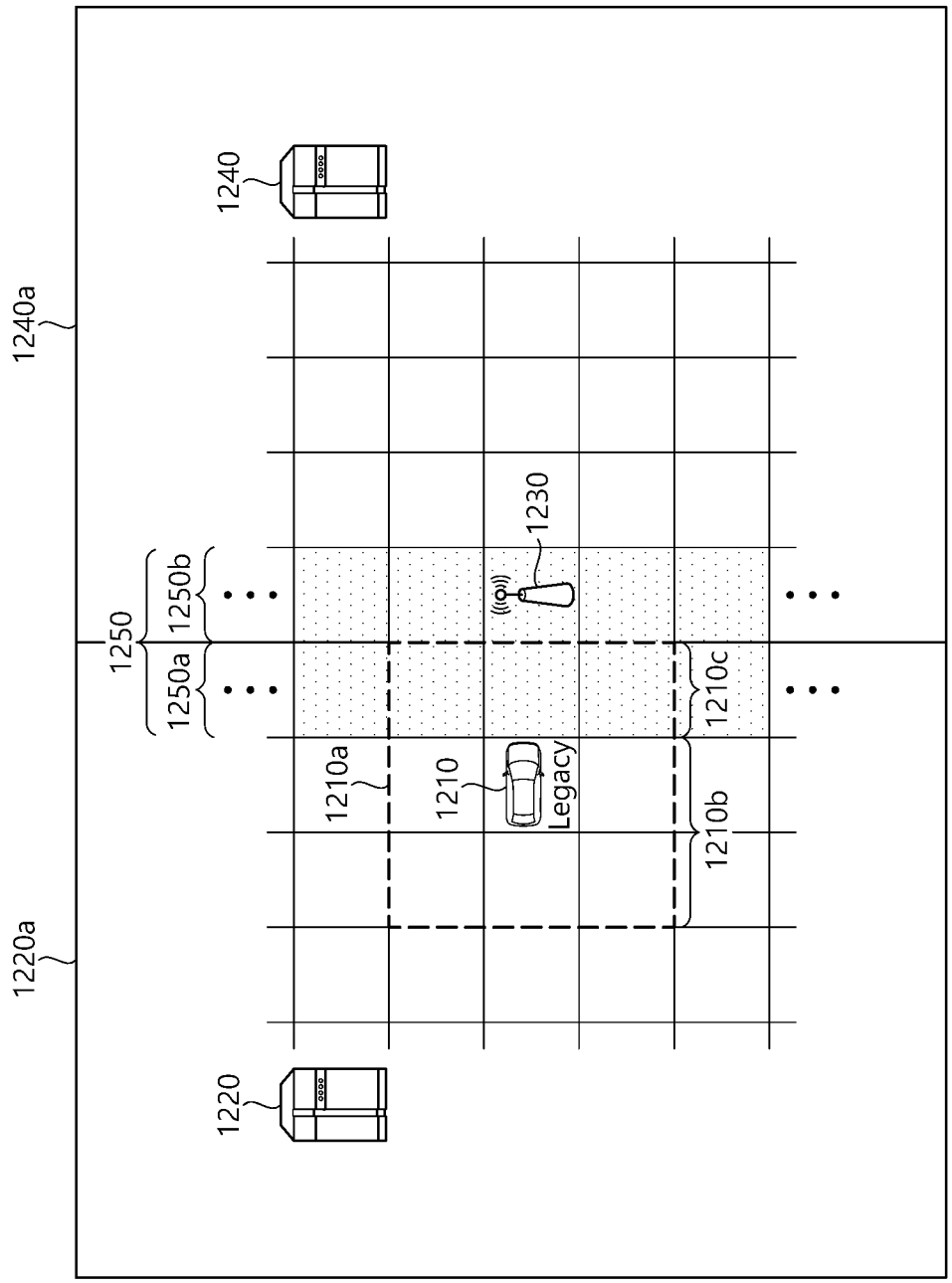
FIG. 12 shows an example of overlapped virtual subscription area between a plurality of local V2X servers according to an embodiment of the present specification.

FIG. 12 shows an example of overlapped virtual subscription area between a plurality of local V2X servers.

A first local V2X server 1220 has a first management area 1220a, and a second local V2X server 1240 has a second management area 1240a. A boundary area 1250 is defined along a boundary between the two management areas 1220a and 1240a. The boundary area 1250 includes a first boundary area 1250a belonging to the first management area 1220a of the first local V2X server 1220 and a second boundary region 1250b belonging to the second management area 1240a of the second local V2X server 1240. Each of the first boundary area 1250a and the second boundary area 1250b includes tiles arranged in a line along the boundary, but this is only an example.

A legacy V2X device 1210 is located in an RSU management area of an RSU 1230. The RSU 1230 can set a virtual subscription area 1210a for the legacy V2X device 1210. When a part or all of the virtual subscription area 1210a overlaps with the boundary area 1250, it is proposed which local V2X server registers the virtual subscription area 1210a.

A part of the virtual subscription areas that does not overlap with the boundary area is registered in the corresponding local V2X server, and a remaining part is registered in all local V2X servers related to the boundary area. The virtual subscription area 1210a can include a first part 1210b that does not overlap with the boundary area 1250 and a second part 1210c that overlaps with the boundary area 1250. The RSU 1230 registers the first part 1210b to the first local V2X server 1220, and registers the second part 1210c to both the first local V2X server 1220 and the second local V2X server 1240. When a V2X message is received from the V2X device associated with the first part 1210b or the second part 1210c, the first local V2X server 1220 transmits the V2X message to the RSU 1230. When the second local V2X server 1240 receives a V2X message from the V2X device associated with the second apart 1210c, the second local V2X server 1240 transmits the V2X message to the RSU 1230.

Figure 13:
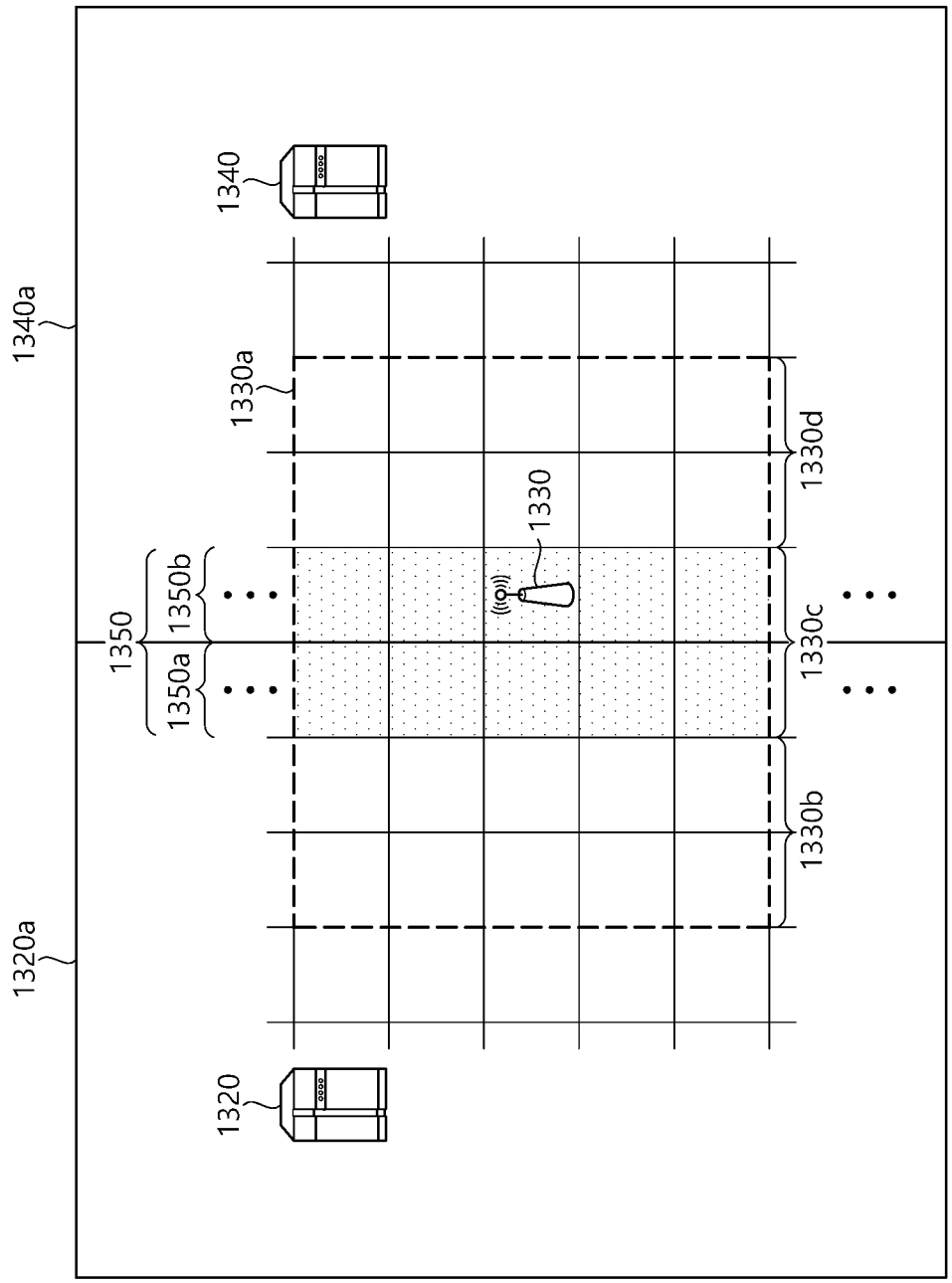
FIG. 13 shows an example of overlapped RSU subscription area between a plurality of local V2X servers according to an embodiment of the present specification.

FIG. 13 shows an example of overlapped RSU subscription area between a plurality of local V2X servers.

A first local V2X server 1320 has a first management area 1320a, and a second local V2X server 1340 has a second management area 1340a. A boundary area 1350 is defined along the boundary between the two management areas 1320a and 1340a.

An RSU subscription area 1330a is configured for the RSU 1330. When some or all of the RSU subscription area 1330a overlaps with the boundary area 1350, it is proposed which local V2X server registers the RSU subscription area 1330a.

A part of an RSU subscription area that does not overlap with the boundary area is registered in the corresponding local V2X server, and a remaining part is registered in all local V2X servers related to the boundary area. The RSU subscription area 1330a includes a first part 1330b belonging to the management area of the first local V2X server 1320 that does not overlap with the boundary area 1350, a second part 1330c that overlaps with the boundary area 1350, and a third part 1330d belonging to the management area of the second local V2X server 1340 that does not overlap with the boundary area 1350. The RSU 1330 registers the first part 1330b to the first local V2X server 1320, registers the second part 1330c to both the first local V2X server 1320 and the second local V2X server 134, and registers the third part 1330d to the second local V2X server 1340. When the first local V2X server 1320 receives a V2X message from the V2X device associated with the first part 1330b or the second part 1330c, the first local V2X server 1320 transmits the received V2X message to the RSU 1330. When a V2X message is received from the V2X device associated with the second part 1330c or the third part 1330d, the second local V2X server 1340 transmits the received V2X message to the RSU 1330.

Figure 14:
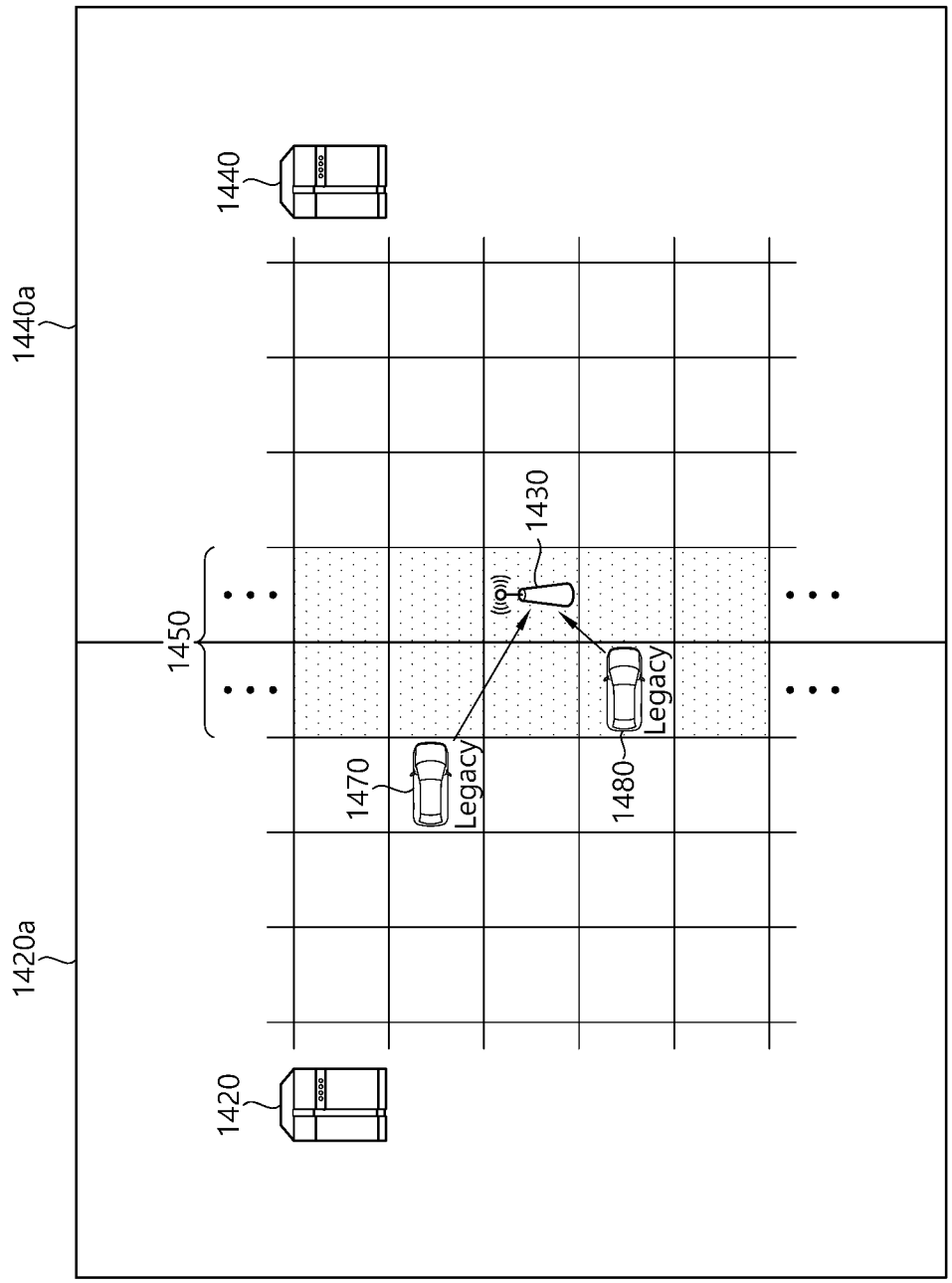
FIG. 14 shows an example in which an RSU publishes a V2X message between a plurality of local V2X servers according to an embodiment of the present specification.

FIG. 14 shows an example in which an RSU publishes a V2X message between a plurality of local V2X servers.

A first local V2X server 1420 has a first management area 1420a, and a second local V2X server 1440 has a second management area 1440a. A boundary area 1450 is defined along the boundary between the two management areas 1420a and 1440a.

A first legacy V2X device 1470 and a second legacy V2X device 1480 are located within a management area of an RSU 1430. The RSU 1430 belongs to the second management area 1440a. When the first legacy V2X device 1470 belongs to the first management area 1420a and the second legacy V2X device 1480 belongs to the boundary area 1450, it is proposed to which local V2X server the RSU 1430 transmits V2X messages received from each legacy V2X device.

When the V2X message is received from the legacy V2X device, the RSU 1430 calculates a publishing area (and/or virtual publishing area) based on the location of the legacy V2X device. The RSU 1430 adds the publishing area to the V2X message, and transmits the added V2X message to the local V2X server. The RSU 1430 can determine a local V2X server based on the publishing area (and/or virtual presentation area) of the legacy V2X device that has transmitted the V2X message.

Since the first legacy V2X device 1470 belongs to the first management area 1420a, the V2X message transmitted by the first legacy V2X device 1470 is delivered to the first local V2X server 1420. Since the second legacy V2X device 1480 belongs to the boundary area 1450, the V2X message transmitted by the second legacy V2X device 1480 is delivered both of the first local V2X server 1420 and the second local V2X server 1440 (e.g., both the first and second local V2X servers 1420 and 1440 cover the boundary area 1450).

In the above examples, although the methods have been described based on the flowcharts using a series of the steps or blocks, the present disclosure is not limited to the sequence of the steps, and some of the steps can be performed at different sequences from the remaining steps or can be performed simultaneously with the remaining steps. Furthermore, those skilled in the art will understand that the steps shown in the flowcharts are not exclusive and can include other steps or one or more steps of the flowcharts can be deleted without affecting the scope of the present disclosure.

What is claimed is:

1. A road side unit (RSU) device for a vehicle-to-everything (V2X) service, the RSU device comprising:
    a processor; and
    a memory operatively coupled with the processor and configured to store instructions that, when executed by the processor, cause the RSU device to perform functions comprising:
    configuring a virtual subscription area for a legacy V2X device which supports communication with the RSU device with device-to-device direct communication protocol but does not support communication with a V2X server, wherein the virtual subscription area assigned by the RSU device is registered to the V2X server as a subscription area for the legacy V2X device and the V2X server delivers to the RSU device any V2X message of a V2X device which is connected to the V2X server and is associated to the subscription area for the legacy V2X device;
    transmitting to the V2X server, information on the virtual subscription area for of the legacy V2X device;
    receiving, from the V2X server, a first V2X message from a first V2X device associated with the virtual subscription area for the legacy V2X device;
    generating a second V2X message based on the first V2X message; and
    transmitting, to the legacy V2X device, the second V2X message.

2. The RSU device of claim 1, wherein the functions further comprise:
    assigning a virtual vehicle-to-everything identifier (V2X ID) for the legacy V2X device.

3. The RSU device of claim 2, wherein the first V2X message includes the virtual V2X ID, and the second V2X message does not include virtual V2X ID.

4. A method for vehicle-to-everything (V2X) service, the method performed by a road side unit (RSU) device and comprising:
    configuring a virtual subscription area for a legacy V2X device which supports communication with the RSU device with device-to-device direct communication protocol but does not support communication with a V2X server, wherein the virtual subscription area assigned by the RSU device is registered to the V2X server as a subscription area for the legacy V2X device and the V2X server delivers to the RSU device any V2X message of a V2X device which is connected to the V2X server and is associated to the subscription area for the legacy V2X device;
    transmitting, to the V2X server, information on the virtual subscription area;
    receiving, from the V2X server, a first V2X message from a first V2X device associated with the virtual subscription area;
    generating a second V2X message based on the first V2X message; and
    transmitting, to the legacy V2X device, the second V2X message.

5. The method of claim 4, wherein the first V2X message includes a virtual V2X ID and a V2X ID of the first V2X device, the virtual V2X ID being an ID of the legacy V2X device assigned by the RSU device.

6. A non-transitory computer-readable medium having computer-readable instructions stored thereon that are executable by a processor and when executed cause the processor to perform functions comprising:

setting a virtual subscription area for a legacy vehicle-to-everything (V2X) device which supports communication with a road side unit (RSU) device with device-to-device direct communication protocol but does not support communication with a V2X server, wherein the virtual subscription area assigned by the RSU device is registered to the V2X server as a subscription area for the legacy V2X device and the V2X server delivers to the RSU device any V2X message of a V2X device which is connected to the V2X server and is associated to the subscription area for the legacy V2X device;

transmitting, to the V2X server, information on the virtual subscription area;

receiving, from the V2X server, a first V2X message from a first V2X device associated with the virtual subscription area;

generating a second V2X message based on the first V2X message; and transmitting, to the legacy V2X device, the second V2X message.

* * * * *